April 21, 1959     F. C. PFEIFER ET AL     2,883,041
CONTAINER
Filed June 27, 1955
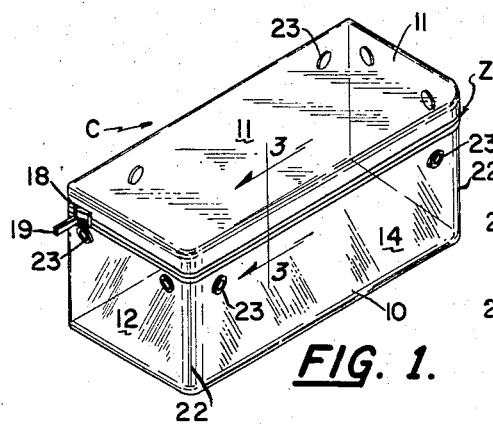
FIG. 1.
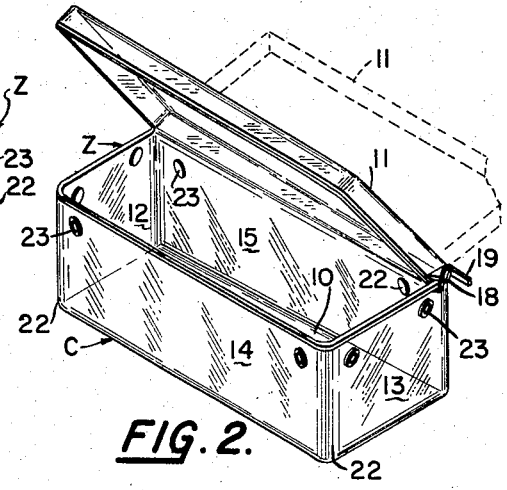
FIG. 2.
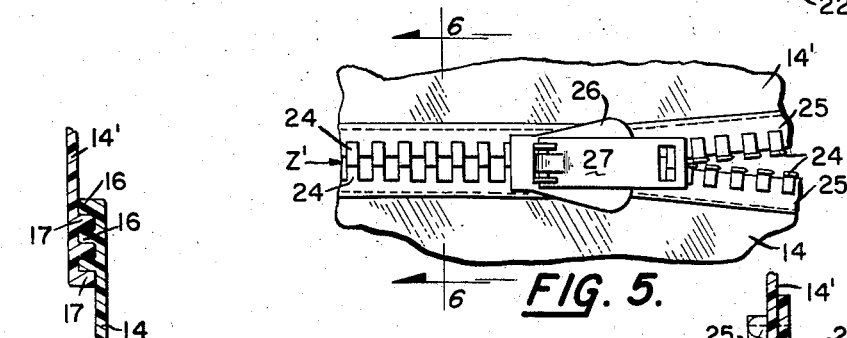
FIG. 3.    FIG. 5.    FIG. 6.
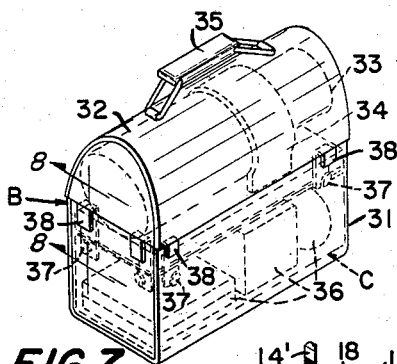
FIG. 7.
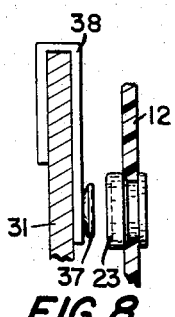
FIG. 8.
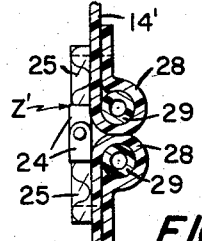
FIG. 9.
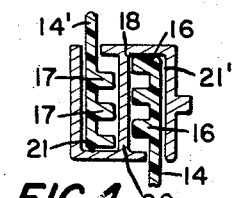
FIG. 4.
INVENTORS.
FRANK C. PFEIFER
EDWIN F. PFEIFER
BY
*Horace B. Van Valkenburgh*
ATTORNEY

United States Patent Office 2,883,041
Patented Apr. 21, 1959

2,883,041

CONTAINER

Frank C. Pfeifer, Denver, and Edwin F. Pfeifer, Derby, Colo.

Application June 27, 1955, Serial No. 518,152

9 Claims. (Cl. 206—4)

This invention relates to containers for food, particularly useful in lunch boxes, picnic baskets or the like.

The presence of ants at picnics is an American tradition, while the entry of various types of insects, particularly into lunch boxes and the like, is a frequent occurrence. Such insects not only consume or spoil the food for use, but also may spoil the appetite of the user. Thus, an individual who would think nothing of eating a sandwich held in a partly clean hand is quite upset over the appearance of ants, cockroaches or the like in his lunch box. Insects vary in size and while a picnic basket or a lunch box may have openings sufficiently small that a larger insect cannot obtain access, there are numerous small insects which have no particular difficulty in entering extremely small cracks and openings. Picnic baskets are often made of woven material, while solid lunch boxes and picnic baskets are often provided with small holes for ventilation, but the same openings which provide ventilation also provide entry for insects. In addition, through use, interfitting edges of the top and bottom of a lunch box often soon become bent out of shape, so that cracks occur between the edges at one or more places, with the lunch box closed. Such cracks provide points of entry for insects and also for sand, dust and the like. It is also customary to wrap sandwiches and other food in waxed paper or similar material, but even when the same is tightly folded about the food, small insects are able to find their way to the food.

In addition to insects, sand, dust and the like may be blown into or enter lunch boxes or picnic baskets and often contact the food placed therein, particularly sandwiches or cake, pie and the like. In the case of lunch boxes, it sometimes happens that the cork in a vacuum bottle becomes loose and the coffee or other beverage in the vacuum bottle will drip or flow down onto the food disposed beneath the vacuum bottle. Needless to say, sandwiches or other food, even partially saturated with coffee or other beverage, are much less appetizing than desired. Also, it may happen that a lunch box or basket will be opened accidentally while being carried and that the food therein will spill out, which is an irritating experience.

Among the objects of this invention are to provide a novel container which is adapted to be closed sufficiently tightly that even small insects are unable to obtain access to the interior; to provide such a container which is particularly adapted to be placed in a larger container, such as a lunch box, picnic basket or the like; to provide such a container which protects food placed therein from access by sand, dust or the like; to provide such a container which prevents food placed therein from contact by a beverage which may leak thereon from a vacuum bottle or other liquid receptacle, as in a lunch box; to provide such a container which may be opened readily for access to the contents at an appropriate time; to provide such a container which can be readily cleaned and therefore maintained in a sanitary condition; to provide such a container which in one form is particularly adapted to be placed in a lunch box and will retain its position therein until opened or closed; to provide such a container for a lunch box which permits the space therein to be utilized effectively and which is not damaged or injured by other articles in the lunch box, such as a vacuum bottle; to provide such a container which may be made of a transparent material so as to increase the appetizing appeal of the contents; to provide such a container which may be made in more than one form; and to provide such a container which may be manufactured relatively economically.

Additional objects and the novel features of this invention will become apparent from the description which follows, taken in connection with the accompanying drawing, in which:

Fig. 1 is a perspective view of a container constructed in accordance with this invention and particularly adapted to be placed in a lunch box or the like;

Fig. 2 is a perspective view of the container of Fig. 1, in open position;

Fig. 3 is a fragmentary cross section, on an enlarged scale, through a zipper like closure formed of plastic material and taken along line 3—3 of Fig. 1;

Fig. 4 is a fragmentary cross section, similar to Fig. 3, but taken through the opening and closing device for the zipper like closure thereof;

Fig. 5 is a fragmentary side elevation, on an enlarged scale, showing an alternative type of closure involving a metal zipper;

Fig. 6 is a vertical section taken along line 6—6 of Fig. 5;

Fig. 7 is a perspective view of a lunch box, showing in phantom outline, in the interior of the lunch box, a vacuum bottle and a container constructed in accordance with this invention containing food items;

Fig. 8 is a fragmentary vertical section, on an enlarged scale, taken along line 8—8 of Fig. 7, showing particularly a hook and a snap fastener, in open position, which may be utilized in attaching the container to the lunch box; and Fig. 9 is a fragmentary vertical section similar to a portion of Fig. 8, illustrating another manner in which part of a snap fastener may be attached to a lunch box.

As illustrated in Figs. 1 and 2, a container C, constructed in accordance with this invention, may be substantially box-shaped or other shape in form and provided with enclosing walls, such as a bottom 10, a top 11, ends 12 and 13 and front and rear sides 14 and 15, respectively. The container walls may be made of a transparent material, as shown, a suitable plastic such as polytetrafluoroethylene, polyvinylchloride, polyvinylbutyral, or other plastic which is flexible as well as transparent, being utilized, although a non-transparent but flexible plastic, such as a "Duran" plastic, may be utilized. The material should be waterproof and also resistant to beverages such as coffee, milk, tea and the like and also should be easily cleaned, as by soap and water. A closure, such as a zipper Z, which may be opened, as in Fig. 2, to provide access to the contents of the container, extends around the end 12, the front side 14 and the end 13, preferably in adjacent but spaced parallel relation to top 11. The zipper Z may be formed of plastic, similar to the walls of the container or made of separate pieces which are secured by a suitable plastic adhesive to the adjacent walls and including, as in Fig. 3, a series of generally rectangular outwardly extending ridges 16 adapted to interfit with similar ridges 17, the ridges 16 being formed on or attached to the lower portion of the front side 14, as well as the ends 12 and 13, with the ridges 17 being similar but extending inwardly from the upper portion 14' of the front side 14 and also the upper portion of the ends 12 and 13. The plastic zipper Z may be provided with an opening and closing device 18, which is provided with a finger pull 19 pivotally attached thereto, so that the device 18 may be moved between the positions of Fig. 1 and Fig. 2. The device 18 may be made of metal and, as in Fig. 4, provided with a transverse partition 20 extending across the larger end thereof, between diverging passages 21 and 21' through which the ridges 17 and 16, respectively, extend. As will be evident from Fig. 4, the diverging passages 21 and 21' and the partition 20, when the device 18 is moved from the position of Fig. 1 to the position of Fig. 2, cause the ridges 16 and 17 to separate, so that the zipper will be opened and the top 11 may be raised or even laid back to the dotted position of Fig. 2, to provide access to the contents of the container C. When the device 18 is moved in the opposite direction, i.e., from the position of Fig. 2 to the position of Fig. 1, the passages 21 and 21' will force the ridges 16 and 17 into engagement with each other, as in Fig. 3, so that the zipper Z will be closed, as in Fig. 1. The front corners 22 of the container between the front side 14 and the respective ends 12 and 13 should be rounded, as shown, so the zipper Z will readily pass around these corners when opening or closing. In addition, on each of the ends 12 and 13 and the sides 14 and 15 and preferably adjacent the position of zipper Z, a series of snaps 23, or other suitable disengageable fastening devices, are attached, so that the container C may be fastened inside a lunch box B or other larger container, as shown in Fig. 6 and described hereinafter.

Instead of the plastic zipper Z, a metal zipper Z' of Figs. 5 and 6 may be utilized, the zipper Z' being conventional and comprising a series of engageable and disengageable metallic segments 24 attached to tapes 25, which may be made of waterproofed cloth or plastic. When made of cloth, the tapes 25 may be stitched to the upper and lower portions 14' and 14 of the front side of the container and to corresponding portions of the ends of the container, while when the tapes are made of plastic, they may be attached by a suitable plastic adhesive. The zipper Z' is also provided with a conventional opening and closing device 26, provided with passages therethrough for forcing the metallic segments 24 together when moved in one direction and apart when moved in the opposite direction. Also, the device 26 may be provided with a finger pull 27 for movement of the device in the desired direction. Again, the preferably rounded corners 22 permit the metallic zipper to be opened and closed without undue difficulty. Since the interfitting ridges 16 and 17 of the zipper Z of Fig. 3 provide an adequate seal to prevent the entrance of small insects, sand, dust and the like, no additional sealing means is normally necessary when such a plastic zipper is utilized. However, when the metal zipper Z' of Fig. 5 is utilized, the edges 28 of the upper and lower portions of the front, side and ends are preferably looped around on the inside over a resilient tube 29, conveniently formed of rubber or a suitable plastic so that when the zipper Z' is closed, the edges 28 will be pressed together and a seal which will prevent the access of smaller insects, sand, dust or the like, will thus be formed.

As illustrated in Fig. 7, a container C may be placed in a larger container, such as a lunch box B formed of metal or other rigid material and having a rectangularly shaped bottom 31 and a top 32, which may be substantially semi-circular in transverse section to accommodate a vacuum bottle 33 fastened therein by a clip 34. The lunch box top 32 may be hinged along its lower rear edge to the upper rear edge of bottom 31 and also may be provided with a carrying handle 35. Food items 36, such as including sandwiches and other food items, may be disposed within the container. Instead of wrapping the food items 36 in wax paper, as is customary in many cases, they may instead be wrapped in a sheet of Pliofilm or other washable plastic, which may be used many times.

The food items 36 may be placed in the container C prior to placing the latter in the lunch box and then the container C fastened in position in the lunch box, as by attaching the snaps 23 of Figs. 1 and 2 to cooperating snaps 37, which may be permanently or removably attached to the lunch box B. For the latter purpose, each of the cooperating snaps 37 may be mounted on a hook 38, shown also in Fig. 8, which may be made of thin metal and is adapted to be inserted over the upper edge of the bottom 31 of the lunch box in an appropriate position. As will be evident from Fig. 8, each snap 23 may be readily disengaged from the cooperating snap 37 and also may be engaged therewith as by pressure from the inside, the flexibility of the top 11 of the container C permitting ready access, so that pressure may be exerted outwardly on a snap 23 to fasten it to the cooperating snap 37. If desired, the cooperating snaps may be permanently attached to the walls of the bottom 31 of the lunch box, as in the case of the cooperating snap 37' of Fig. 9, which is shown as riveted but may be permanently attached in any other suitable manner.

The flexibility of top 11 of the container C, in addition to facilitating access to the snaps 23 or other disengageable fastening devices, also permits the space within the lunch box B to be utilized more effectively. Thus, the height of the container C may be made substantially equivalent to the height of the bottom 31 of the lunch box, but in the usual lunch box the vacuum bottle 33 will extend at the center below the upper edge of the bottom 31. However, the flexible top 11 permits the upper portion of the container to be pressed downwardly by the vacuum bottle without danger of breakage or damage to the bottle and also permits the food articles to extend upwardly within the container at the adjacent front and rear edges of the bottom 31 of the lunch box. In the event the lunch box becomes open accidentally, the container C will not tend to fall out, when attached to the lunch box, but even if the container C does fall out, the food therein will not be dirtied. Also, a container made of a flexible, waterproof material can be easily maintained clean, while liquids such as beverages, if dripping or flowing thereon, will not reach the contents. In addition, food items are readily packed therein.

Although the container of this invention has been illustrated and described as being particularly adapted to be used in a rigid lunch box, it will be understood that such a container may be used in other larger, rigid containers, such as picnic baskets and the like. It will also be understood that other types of closures or fastening means and that materials other than those specifically referred to may be used. Thus, it will be understood that other embodiments may exist and various changes may be made therein, without departing from the spirit and scope of this invention.

What is claimed is:

1. In combination, a lunch box formed of relatively rigid material and having a box-shaped lower section open at its top, and an upper section fitting into said bottom section and hinged along one side to an upper edge of said lower section; and a container having a size to fit into said lower section of said lunch box, said lower section of said lunch box and said container having cooperating fastening means removably fastening said container in said lunch box, said container comprising a box-shaped structure formed of a flexible, washable material and having a top, a bottom, ends and sides, one side and each end being separable along a line spaced from said top but above said fastening means, and separate fastening means for opening and closing said side and ends along said line.

2. In the combination of claim 1, wherein said fastening means on said lunch box includes hooks for removably attaching the same to said lunch box.

3. In the combination of claim 1, wherein said fastening means on said lunch box is fixedly attached thereto.

4. In the combination of claim 3, wherein such fixed attachment includes rivets.

5. In combination of claim 1, wherein the corners of said container between said one side and each of said ends are rounded; and a plastic zipper extends along said separable line and includes interfitting, opposed ridges extending toward each other from the upper and lower portions of said one side and ends, and a device for forcing said ridges into interfitting engagement and for moving said ridges apart.

6. In the combination of claim 1, wherein the corners of said container between said one side and each of said ends are rounded; a zipper extends along said separable line and includes a tape attached to each of the upper and lower portions of said one side and ends, a plurality of engageable and disengageable metal segments mounted on each said tape, and a device for engaging and disengaging said metal segments; and a resilient tube extends along the inside of said one side and ends, both above and below said line, the edges of the upper and lower portions of said one side and end surrounding the respective resilient tube, so that the opposed portions of said edges will be pressed together with said zipper closed.

7. In combination, a lunch box formed of relatively rigid material and having a lower section having an open top and a bottom, ends and sides and an upper section hinged along the rear side to said lower section; and a container having a size to fit into said lower section of said lunch box, said lower section of said lunch box and said container having cooperating snaps for removably fastening said container in said lunch box, said snaps on said container being attached to the sides and ends thereof, said container comprising a structure formed of a flexible, washable material and having enclosing walls including a top, a portion of said walls being separable along a line spaced from said top but above said snaps, and fastening means opening and closing said container walls along said line.

8. In the combination of claim 7, wherein each said snap on said lunch box is mounted on a relatively thin, flat metal hook removably mounted on the upper edge of the lower section of said lunch box.

9. In the combination of claim 7, wherein said snap on said lunch box is fixedly attached thereto adjacent the upper edge of said lower section of said lunch box.

References Cited in the file of this patent

UNITED STATES PATENTS

| | | |
|---|---|---|
| 913,569 | Shrum | Feb. 23, 1909 |
| 1,653,556 | Faber | Dec. 20, 1927 |
| 1,860,029 | Held | May 24, 1932 |
| 1,864,200 | Kaufmann | June 21, 1932 |
| 2,013,852 | Odendahl | Sept. 10, 1935 |
| 2,261,157 | Holbrook | Nov. 4, 1941 |
| 2,333,410 | Busch | Nov. 2, 1943 |
| 2,580,281 | Burton | Dec. 25, 1951 |
| 2,613,421 | Madsen | Oct. 14, 1952 |
| 2,634,835 | Mayers | Apr. 14, 1953 |
| 2,648,412 | Meyers | Aug. 11, 1953 |
| 2,672,232 | Kessell, Jr. | Mar. 16, 1954 |
| 2,724,208 | Nelson | Nov. 22, 1955 |
| 2,731,996 | Hayes | Jan. 24, 1956 |
| 2,777,181 | Morner | Jan. 15, 1957 |